(12) United States Patent
Robinson

(10) Patent No.: US 7,471,418 B2
(45) Date of Patent: Dec. 30, 2008

(54) IMAGE/DOCUMENT ANALYSIS TOOL AND METHOD FOR MULTI-STATION IMAGE FORMING DEVICE

(75) Inventor: David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 653 days.

(21) Appl. No.: 11/142,411

(22) Filed: Jun. 2, 2005

(65) Prior Publication Data

US 2006/0274375 A1 Dec. 7, 2006

(51) Int. Cl.
*H04N 1/40* (2006.01)

(52) U.S. Cl. .................. 358/1.9; 358/3.26; 358/518; 358/504; 358/540; 358/3.06; 358/3.21; 358/3.24; 382/162; 382/167

(58) Field of Classification Search .......... 358/1.9, 358/3.21, 3.24, 3.26, 306, 518, 540; 399/301; 382/162, 167
See application file for complete search history.

(56) References Cited

U.S. PATENT DOCUMENTS

| 2,297,691 | A | | 10/1942 | Carlson |
| 5,729,634 | A | * | 3/1998 | Robinson .................. 382/254 |
| 2004/0012823 | A1 | * | 1/2004 | Hendrix et al. ............ 358/474 |
| 2008/0037070 | A1 | * | 2/2008 | Chen ......................... 358/3.26 |
| 2008/0094439 | A1 | * | 4/2008 | Yoshida et al. ............... 347/19 |
| 2008/0100624 | A1 | * | 5/2008 | Matsunaga ............... 345/469.1 |
| 2008/0101698 | A1 | * | 5/2008 | Yago ......................... 382/171 |

* cited by examiner

*Primary Examiner*—Twyler L Haskins
*Assistant Examiner*—David L Suazo
(74) *Attorney, Agent, or Firm*—Oliff & Berridge, PLC

(57) ABSTRACT

A document analysis tool may generate a halftone image corresponding to the output of an image forming device and may display the generated halftone image for a document designer. The halftone image may include halftone dots displaced from each other, depending on a misregistration between image forming stations in the image forming device. Based on the quality of the displayed halftone image, the document designer may revise the document to account for the misregistration.

20 Claims, 8 Drawing Sheets

IMAGE/DOCUMENT ANALYSIS TOOL AND METHOD FOR MULTI-STATION IMAGE FORMING DEVICE

BACKGROUND

This invention relates to systems and methods for adjusting an image to be printed by a multi-station image forming apparatus.

In electrophotographic printing, a photoconductive surface is charged and is then selectively exposed to image data to selectively discharge portions of the charged photoconductive surface. This forms a latent electrostatic image on the photoconductive surface. Charged toner material is then applied to the latent image bearing portion of the photoconductive surface to convert the latent electrostatic image into a developed image. Finally, the developed, or toner, image is transferred to a sheet of recording material, such as paper, by charging the backside of the paper to attract the toner of the developed image from the photoconductive surface to the paper. The developed, or toner, image is then at least semi-permanently fixed to the sheet of recording material, such as, for example, by heating a thermoplastic toner material to fuse the toner to the sheet of recording material. An example of this process is more fully described in U.S. Pat. No. 2,297,691.

In full color image-on-image systems, this process is repeated a number of times on the photoconductive surface to build a multilayer full-color image. In the image-on-image technique, a first latent image is developed onto a portion of the photoconductive surface. Subsequent latent images are exposed through the first image, on the same portion of the photoconductive surface, and then developed.

As an option to full color image forming devices, color image forming devices have also been designed and developed which apply a single additional highlight color (HLC) to a black toner image. The highlight color is used to draw the attention of the document reader to particular portions of the document. For example, highlight color image forming devices are often used to generate invoices for services, wherein the total of the invoice is printed in the highlight color or surrounded by a box in the highlight color.

SUMMARY

However, because in highlight color image forming devices, as well as full color image forming devices, each different color image element is exposed at a separate color station, it is possible that the exposure portion of photoconductive surface for one color (black, for example) is not registered exactly with the exposure portion of the photoconductive surface for another color (highlight color, for example). In particular, the photoconductive belt may move or stretch, so that the portion exposed for application of the black toner particles is not exactly registered with the portion exposed for the color toner particles. For this reason, the output from the highlight color printer may have the color image elements displaced slightly relative to the black image elements, as compared to the output as intended by the document designer.

As used herein, the term "document" is intended to encompass one or more images, for example, in hardcopy or electronic form. For example, a document may include a single image that may be rendered by a printing device by a plurality of separate images. Thus, the term document is not intended to be limiting, and should be understood to include single or multiple images and single or multiple pages.

Exemplary systems and methods described herein provide a document analysis tool that may render a display of a representation of a designed document as will be printed by a color printer including a misregistration between one color station and another color station. In exemplary embodiments described herein, the one color station may be a black color station, and the other color station may be a highlight color station.

Exemplary embodiments of a document analysis tool may include an anticipated misregistration between different color stations, a scale factor of the display, and/or a type of image forming device on which the document is to be printed as input data. In response to such input data, the document analysis tool may produce a displayed image of an expected output of the image forming device, wherein an expected misregistration of different color image elements may be applied to the displayed image. The display may render an image of the document according to a halftone scheme of a particular image forming device.

Exemplary embodiments of a document analysis tool therefore may include an input device arranged to input at least one display parameter, a halftone image generator configured to generate a halftone image representative of an output of an image forming device based on the at least one display parameter input, and a display arranged to display the halftone image generated by the halftone image generator.

Thus, in exemplary embodiments, an operator may view the displayed image, and decide if the expected output of the document, as designed, is acceptable. If so, the operator may choose to print the document without modification. If the displayed document is not acceptable, the operator may revise the document, for example, to adjust placement of document elements to avoid undesirable artifacts produced by the misregistration, for example, of different color print stations.

In exemplary embodiments, systems and methods may be used independently of a program used to design the document. In such embodiments, the document design may only be analyzed by the document analysis tool. In other exemplary embodiments, the document analysis tool may include a document design tool, allowing the document designer to adjust the image elements, display results including any misregistration, make adjustments to the document, and even save the adjusted document without leaving the document analysis tool.

These and other features and advantages are described in, or are apparent from, the following detailed description.

BRIEF DESCRIPTION OF THE DRAWINGS

Various exemplary details are described with reference to the following figures, wherein.

DETAILED DESCRIPTION

Exemplary systems and methods are described with respect to a highlight color image forming device. However, such description should be understood as exemplary only, as the systems and methods may apply to other types of multi-station image forming devices, including any image forming device susceptible to misregistration of images applied at the different stations. In addition, exemplary systems and methods may by applicable to other types of printers, such as ink jet printers, and are therefore not limited to xerographic image forming devices.

Figure 1:
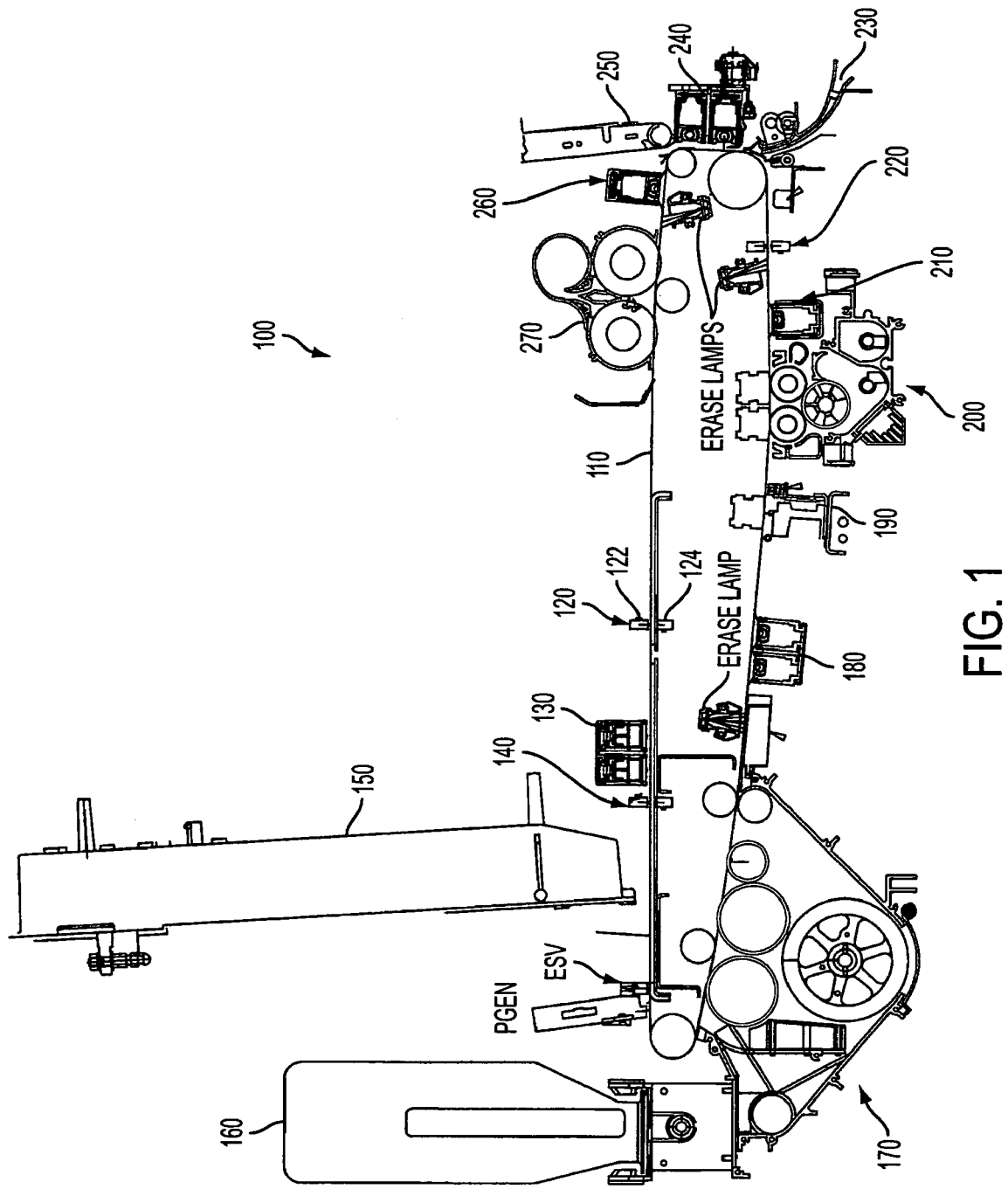
FIG. 1 is an exemplary highlight image forming device.

FIG. 1 shows an exemplary color image forming device 100. The color image forming device 100 of FIG. 1 may be a highlight color image forming device that applies a highlight color, in addition to black, to a recording medium such as paper. The image forming device 100 may apply charge substantially uniformly across a photoconductive belt 110, using a charging unit 130. Charging unit 130 may be, for example, a dicorotron. The photoconductive belt 110 may then travel past an exposure unit that may include a raster output scanner (ROS) 150 that may irradiate the photoconductive belt 110 according to a pattern which corresponds to the data of the document elements which are to be black in color. The exposed photoconductive belt 110 may then travel past a black developing unit 170 that may deposit black toner particles onto the photoconductive belt 110. The black toner particles may adhere electrostatically to the charged areas of the photoconductive belt 110, but may not adhere to the uncharged areas.

The photoconductive belt 110 may then travel past another charging unit 180, which may again apply a substantially uniform charge across the photoconductive belt 110. The charged photoconductive belt 110 may then travel past a color exposing unit 190 that may contain light emitting diodes, for example, which may irradiate the surface of the photoconductive belt 110 according to the occurrence of color elements in the document. The exposed photoconductive belt 110 may then travel past a color developing unit 200 that may deposit color toner particles on the photoconductive belt 110. The color toner particles may adhere electrostatically to the charged areas of the photoconductive belt 110, but may not adhere to the uncharged areas.

The raster output scanner 150 and the color exposing unit 190 may irradiate the photoconductive belt 110 with a halftone pattern appropriate for image forming device 100. The output of image forming device 100 may consist of a number of halftone cells, each of which includes a number of printed dots. For example, printing a 75 lines per inch halftone grid on a 600 dots-per-inch laser printer produces a halftone cell that is 600/75=8 pixels wide, for a total cell size of 8×8 or 64 laser printer dots. Shades of gray may be provided by varying the size or frequency of the printer dots within the halftone cell.

For example, for image forming device 100 to output areas corresponding to black, raster output scanner 150 may irradiate the photoconductive belt 110 with a series of dots with size or frequency of occurrence determined by the blackness of the output to be rendered. Similarly, exposing unit 190 may irradiate the photoconductive belt 110 with a series of dots with size or frequency of occurrence determined by the brightness of the color to be rendered.

The photoconductive belt 110 may thus contain black and color toner particles in areas corresponding to the black and color areas of the document. The toner may be transferred to a recording medium in a transfer unit. A sheet of the recording medium, such as paper, may be taken from a paper supply 230. The backside of the sheet of paper may be charged by a charging unit 240, and the charged paper may then attract the toner particles from the photoconductive belt 110. The toner particles may adhere to the sheet of paper electrostatically. The paper may then be separated from the photoconductive belt 110 and transferred to a fixing unit 250, which may heat the paper to fuse the toner particles to the paper. The paper may then be directed to an output bin (not shown).

The photoconductive belt 110 may be provided with a plurality of holes that may be detected by belt hole sensors 120, 140 and 220. The belt hole sensors 120, 140 and 220 may use, for example, a light source 122 that shines light against the photoconductive belt 110. The belt hole sensors 120, 140 and 220 may detect passage of the holes by detecting the light transmitted through the belt holes onto a detector 124 located on the other side of the photoconductive belt 110. The belt hole sensors 120, 140 and 220 may thereby detect stretching or other unexpected displacements of the photoconductive belt, and adjust timing of the exposure units 150 and 190 to accommodate such variables.

However, the ability of the belt hole sensors 120, 140 and 220 to measure and detect movement of the belt is limited. The belt may stretch as a result of tension, and the stretching may be influenced by environmental conditions such as relative humidity. The belt holes may also be of a non-uniform or unexpected shape, which may result in an erroneous computation of the exact speed of the belt past the belt hole sensor. Since the exposure units are timed to irradiate the belt at exactly the correct point in the travel of the belt past the respective exposure unit, errors in calculating the speed of the belt lead to errors in the application of the radiation on the surface of the photoconductive belt. Variable or non-uniform belt speed may also be a source of registration error, for example, resulting from less than ideal servo-motors driving the belt.

As a result, a misregistration in the placement of the black toner relative to the placement of the color toner on the photoconductive belt 110 may occur. The misregistration may occur in the process direction (i.e., in the travel direction of the photoconductive belt 110), or in the cross-process direction (i.e., in the width direction of the photoconductive belt 110). In general, misregistration in the process direction may be larger than the misregistration in the cross-process direction, as the stretching movement of the belt under tension is typically larger than the lateral movement of the photoconductive belt 110 on the transport rollers.

The magnitude of misregistration may be determined by measurement and associated with the image forming device 100 as a portion of the specification of the image forming device 100. Such misregistration may occur relatively predictably, affecting each rendered image in a similar way, or may occur differently with each rendered image, and may be described by a statistical quantity, such as a standard deviation of misregistration.

The misregistration may alternatively be observed by the user rather than known or associated with a particular model of the image forming device 100. The misregistration may be observed as a displacement between the color elements in the document and the black elements of the documents output by the image forming device 100.

Figure 2:
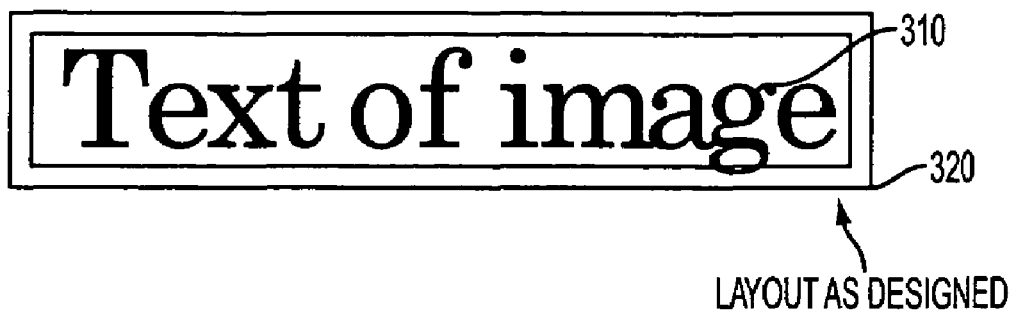
FIG. 2 illustrates an exemplary layout of a portion of a document.
Figure 3:
FIG. 3 illustrates the exemplary layout of FIG. 2 with a misregistration between the black image elements and the color image elements.
Figure 4:
FIG. 4 illustrates the exemplary layout of FIG. 2, with the image elements adjusted to account for the misregistration.

FIG. 2 illustrates the placement of black image elements and highlight color image elements in the document as designed. In FIG. 2, the black image elements are the text such as the "g" 310 placed within the image. The text may be surrounded by a box 320 in the highlight color. As designed, the "g" 310 fits within, and partially overlaps the box 320. However, when the image is output by a highlight image forming device 100, the highlight element, box 320, may be displaced slightly with respect to the "g" 310, as shown in FIG. 3. As a result, a blank portion of the color image element 320 appears where the "g" was expected to overlap the highlight color element 320, and instead, the "g" 310 appears slightly displaced from its expected location within the color image element 320. If the document designer is aware of the possibility of misregistration of the image elements in the output image, he may elect to separate the black image elements from the color image elements, as illustrated in FIG. 4. This document layout may avoid the negative effects of misregistration of the image elements in the output image.

Figure 5:
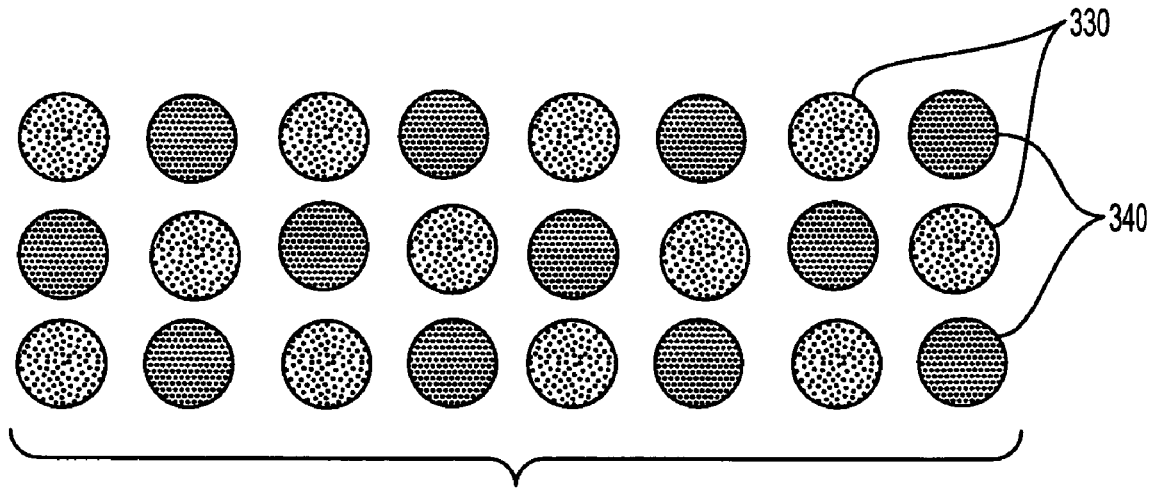
FIG. 5 illustrates a document with pixels of different colors interspersed in a same region.
Figure 6:
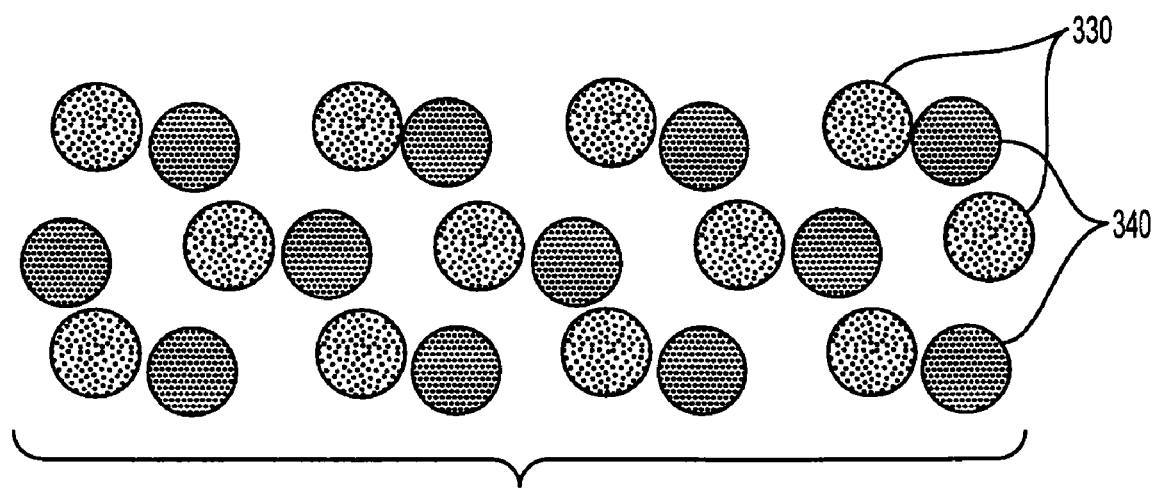
FIG. 6 illustrates an effect of misregistration on the interspersed pixels of FIG. 5.

FIGS. 5 and 6 illustrate another possibly unanticipated effect of misregistration of the image elements on the output of the highlight image forming device 100. In FIG. 5, a document designer has designed the document to have the black pixels 330 interspersed with the highlight color pixels 340, to tint the output highlight color to be a deeper color, for example. However, because of misregistration of images rendered by the black exposure unit 150 with respect to images rendered by the color exposure unit 190, the black pixels 330 may be displaced with respect to the color pixels 340, as shown in FIG. 6. The displacement may result in "banding," or stripes of alternating lighter and darker apparent colors within an area which was intended to be of a uniform color.

The document designer may not be aware of such problems illustrated by FIGS. 3 and 6, until he has committed to output what may be a large number of prints. However, using a document analysis tool, the document designer may preview the expected output of image forming device 100, and adjust his document to avoid negative artifacts, such as those illustrated in FIGS. 3 and 6.

Figure 7:
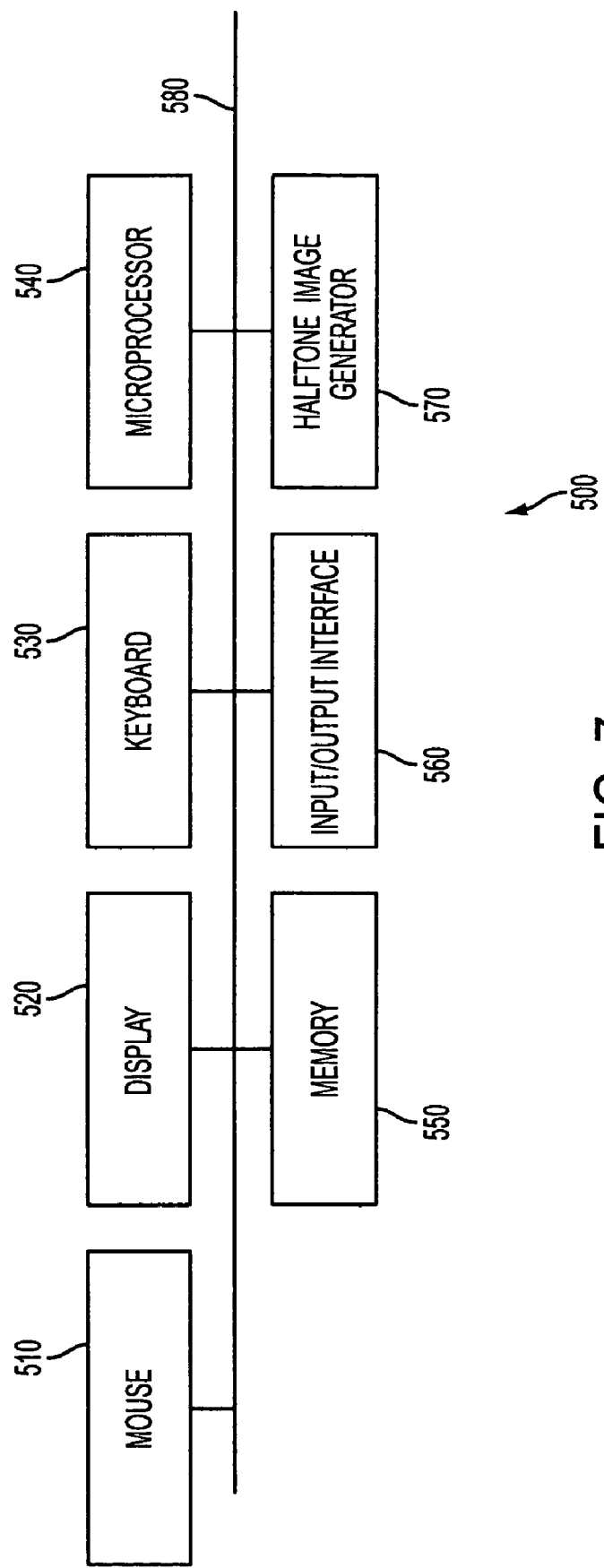
FIG. 7 shows an exemplary embodiment of a document analysis design tool.

FIG. 7 shows an exemplary embodiment of document analysis tool 500. The document analysis tool 500 may include a mouse 510, a display 520, a keyboard 530, a microprocessor 540, a memory 550, an input/output interface 560, and a halftone image generator 570. The foregoing components 520-570 may be coupled on a bus 580, or may be implemented as components of an application-specific integrated circuit (ASIC). Any combination of hardware and software may be used to implement the components of the document analysis tool 500 as illustrated in FIG. 7. It should be understood that the document analysis tool 500 may be embodied in a suitably programmed personal computer, for example, including the above-mentioned components. The document analysis tool 500 may also be coupled to an image forming device 100, such as a xerographic image forming device, to output the document analyzed by the document analysis tool 500.

The document designer may input values associated with the image forming device 100 to be used to output the document. The input values may be input to the input/output interface 560. Such values may include vertical (in process direction) misregistration and horizontal (cross-process direction) misregistration associated with image forming device 100 and/or observed by the document designer according to past usage of image forming device 100. The input values may also include a scale factor with which the document designer would like to view the expected output of the image forming device 100. The input/output interface 560 may receive input identifying the image forming device and/or the halftoning scheme to be used. The input values may be input using keyboard 530 or mouse 510 in conjunction with display 520. The input values may be stored in memory 550.

The document analysis tool 500 may then generate a sample output image using the halftone image generator 570. The sample output image may be displayed on display 520, for example. The halftone image generator 570 may generate an image representative of the output that may be expected from image forming device 100, based on the input values for misregistration and the halftoning scheme used by the image forming device 100. Depending on the scale factor selected by the document designer, the document analysis tool 500 may generate an image showing the location and placement of the individual laser dots making up the halftone cells of the output document, or the document analysis tool 500 may only show general placement of the black image elements relative to the color image elements. For a misregistration of 100 μm, for example, on a 600 dots-per-inch laser printer, the halftone image generator may generate a halftone image with the laser dots shifted by about 2.3 dot spacings, 600 dots per inch×100 μm/25400 μm/inch=2.3.

Figure 8:
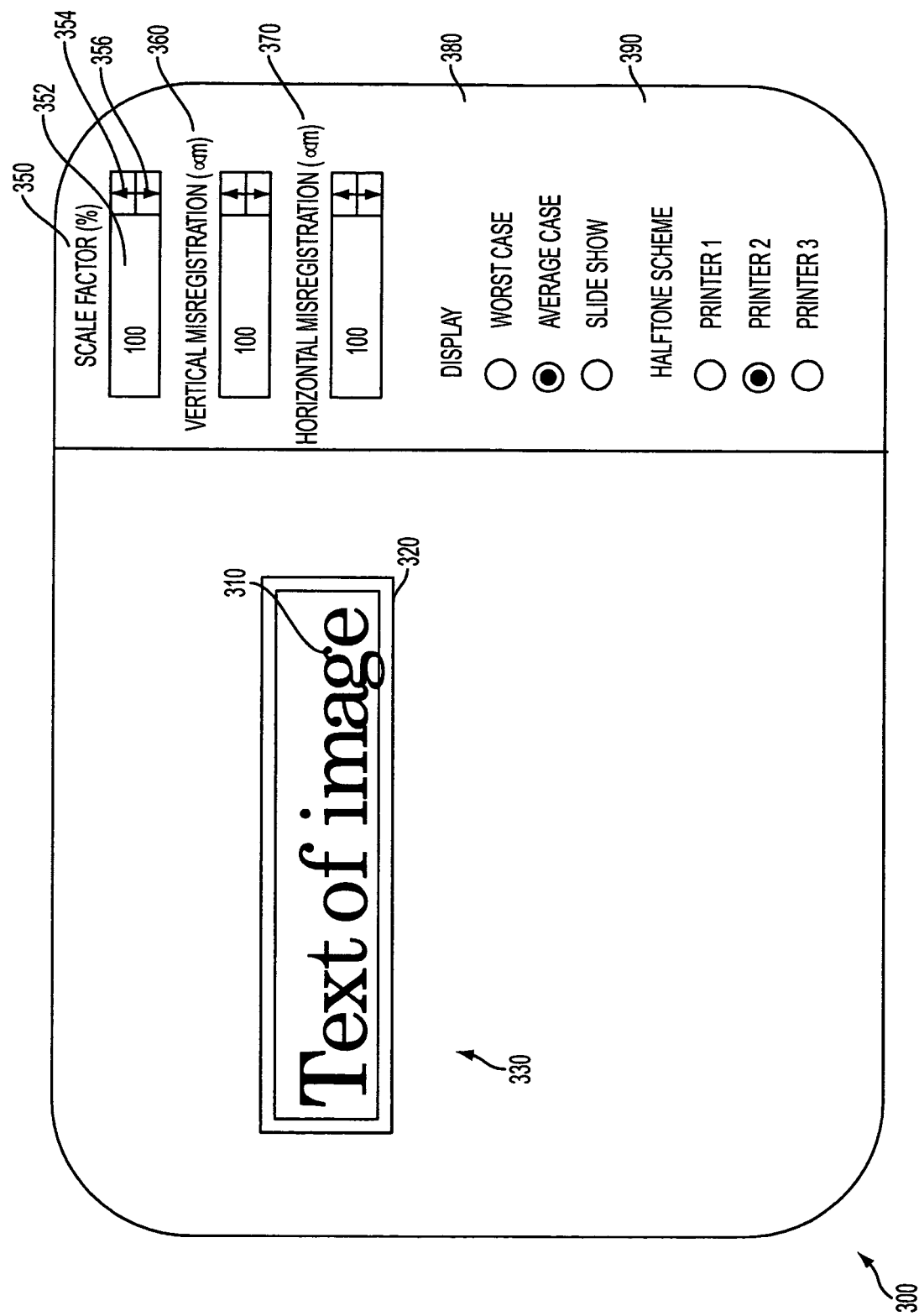
FIG. 8 illustrates an exemplary screen shot of a user interface for the document analysis tool of FIG. 7.

FIG. 8 shows an exemplary screen shot 300 of a display screen generated by document analysis tool 500. The screen shot 300 may include at least a portion of the document including black elements, such as text 310 shown in FIG. 8, and color elements, such as box 320 shown in FIG. 8. The screen may also include parameter input objects, such a parameter input panels 350-390, which may be used to input the display values. For example, panel 350 may be used to input a value of the scale factor used to render the image of the expected output of the image forming device 100. The scale factor may be input by typing a value in box 352, or by selecting an "up" arrow 354 or a "down" arrow 356, for example, using mouse 510. Similarly, panel 360 may be used to input a value of vertical misregistration and panel 370 may be used to input a value of horizontal misregistration. Panel 380 may be used to select the image to be displayed, for example, corresponding to an average misregistration or to a worst case.

Panel 390 may be used to select a model of the image forming device 100 to be used, or to designate a halftoning scheme to be used by the image forming device 100.

The document analysis tool 500 may then generate a sample image 330, including black image elements 310 and color image elements 330, with the selected misregistrations 360 and 370. The sample image 330 may depict the pixels of the image as rendered by the halftoning scheme of the image forming device 100. If the scale factor is sufficiently large, the individual color pixels of the halftone image may be visible in screen shot 300, for example, in a manner similar to the illustration of FIGS. 5 and 6. The document designer may observe the sample image 330 and determine if the sample image 330 is acceptable. If acceptable, the document designer may proceed to print the document on image forming device 100. If unacceptable, the document designer may invoke a program used to design the document and make changes, for example, suggested by the document analysis tool 500.

Document analysis tool 500 may also be designed to allow the document designer to adjust the document within the display 300. For example, document analysis tool 500 may be equipped with an edit feature that allows the document designer to "click-and drag" the corners of box 320 to expand its size relative to text 310. The microprocessor 540 may then adjust the document data in a manner corresponding to the adjusted position of the image element, save the altered document data in memory 550 and/or output the altered document to image forming device 100.

Figure 9:
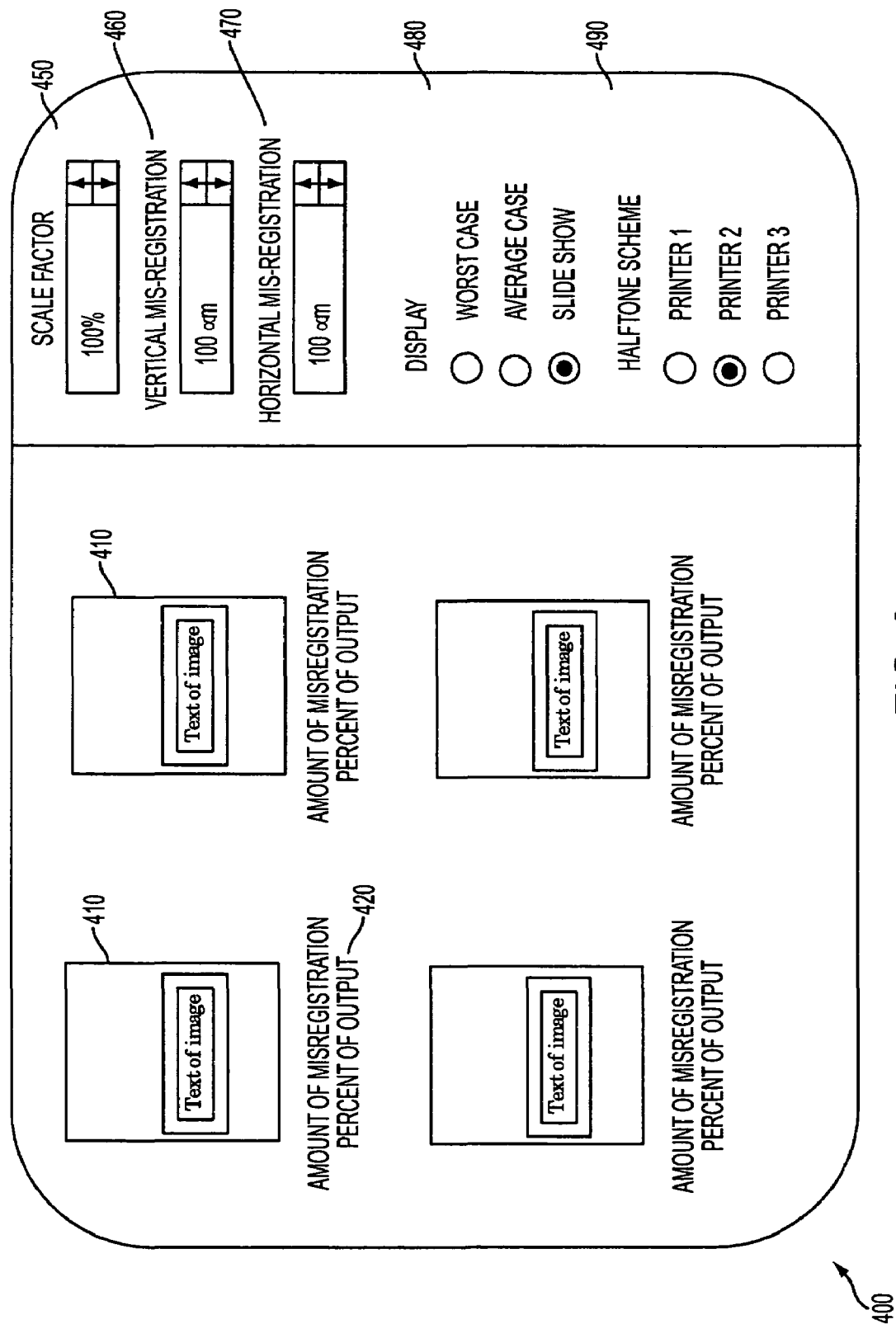
FIG. 9 illustrates another exemplary screen shot of the a interface for the document analysis tool of FIG. 7.

The document analysis tool 500 may alternatively display a slide show 400, showing varying degrees of misregistration from none to worst case, as represented in FIG. 9. Each slide 410 in the slide show may depict the output of the image forming device 100 with a particular amount of misregistration. The document analysis tool 500 may also display the relative proportion 420 of the output generated by image forming device 100, which may be expected to exhibit each amount of misregistration 410. The document designer may decide, based on this information, whether the amount of output which may have to be discarded is acceptable.

It should be understood that the features shown in FIGS. 8 and 9 are not intended to provide an exhaustive list of the possible features that may be implemented by document analysis tool 500. Any of a number of additional features may be displayed including, or instead of, those shown in FIGS. 8 and 9. For example, additional features may include options for displaying multiple pages of a document or multiple images of a given document on different image forming devices.

Figure 10:
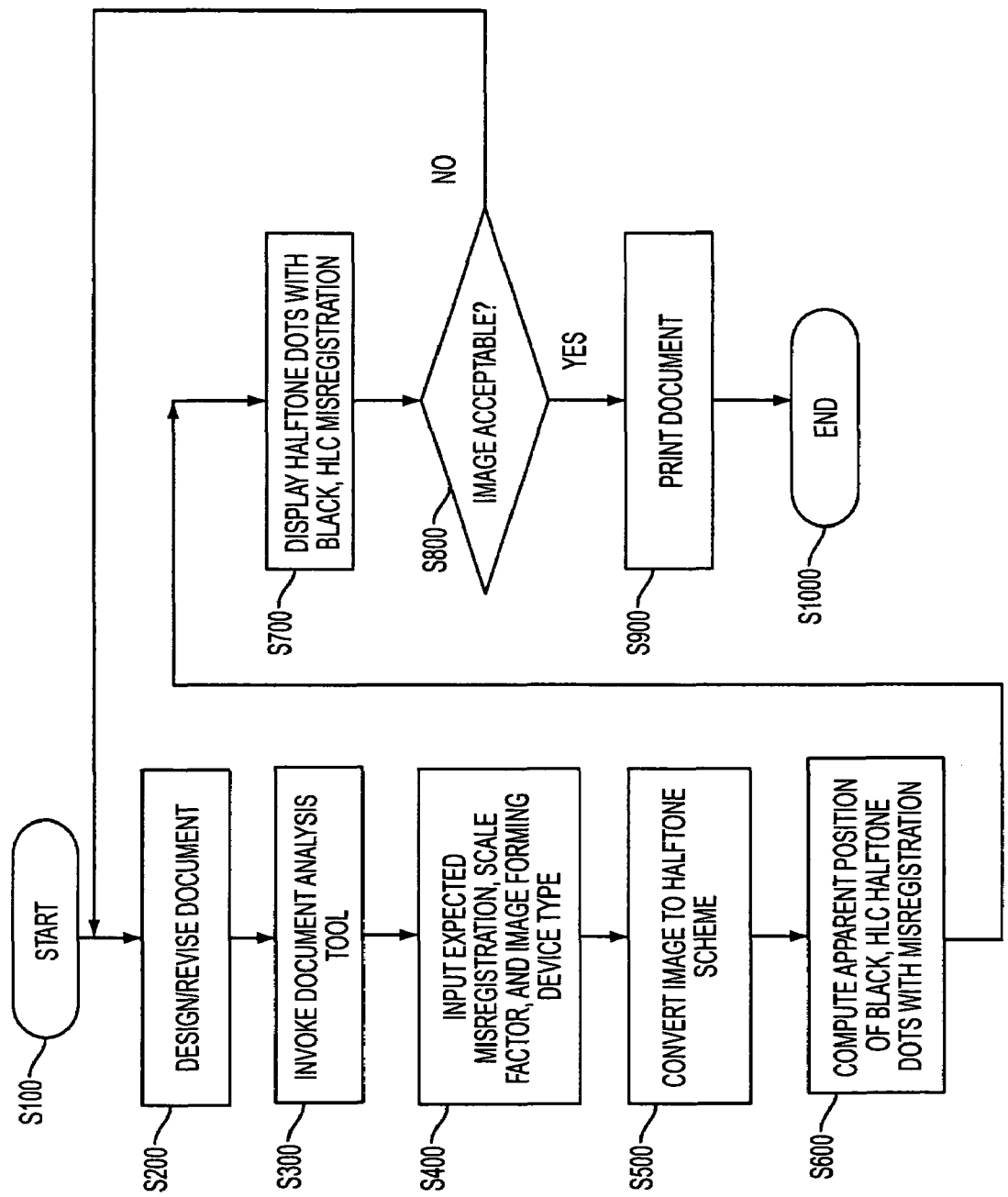
FIG. 10 shows a flow chart of an exemplary method of analyzing a document.

FIG. 10 shows a flowchart outlining an exemplary method of analyzing a document based on the parameters input for the image forming device to be used to output the document. The method begins in step S100 and continues to step S200, in which the document is designed. The document analysis tool may be invoked in step S300, and in step S400, the input parameters may be input to the document analysis tool. The input parameters may include, for example, the expected misregistration, the scale factor for the displayed image, and the image forming device type.

In step S500, the document may be converted into an image depicting the halftone of the document to be printed on the image forming device selected in step S400. In step S600, the respective positions of pixels of black and color (HLC) halftone images may be computed according to the misregistration input in step S500. In step S700, the halftone rendering of the document with the appropriate misregistration between black and color pixels may be displayed for the document designer. In step S800, a determination may be made whether the image is acceptable. If not, the method may return to step S200, in which the document may be revised. If the image is acceptable, the document may be printed in step S900. The method ends in step S1000.

Figure 11:
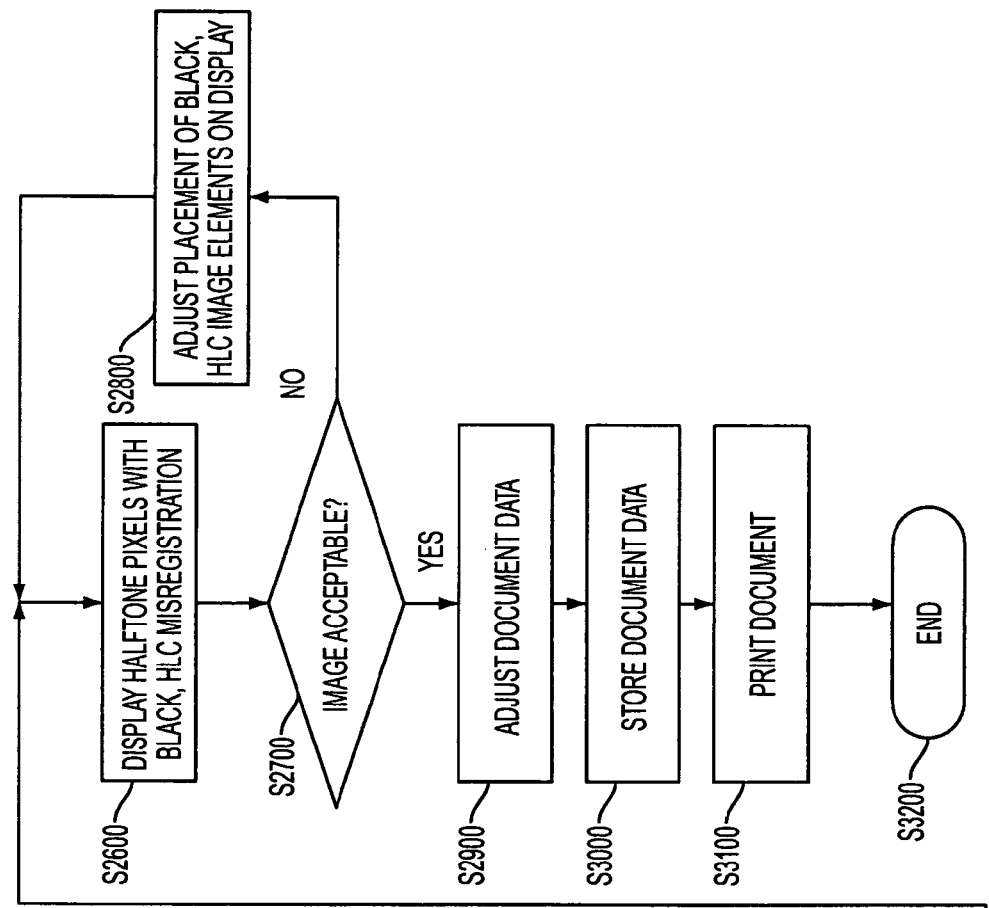
FIG. 11 shows another flow chart of an exemplary method of analyzing and designing a document.
Figure 11:
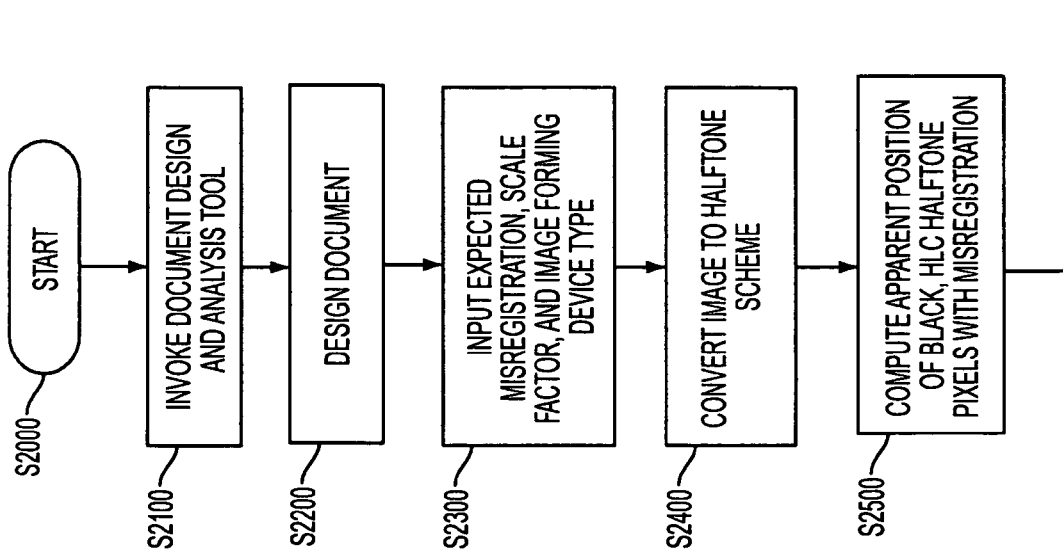

Instead of using the document analysis tool to simply analyze a document generated by another document generating program, the document analysis tool may be integrated with a document design program, so that the document may be edited while viewing the effects of misregistration on the designed document. Such an exemplary embodiment is illustrated by the exemplary method shown in FIG. 11. The method starts in step S2000 and proceeds to step S2100, in which the document design and analysis tool may be invoked. In step S2200, the document may be designed. In step S2300, the input parameters of the image forming device may be input, such as the expected misregistration and image forming device type. The scale factor for the image to be displayed may also be selected in step S2300. In step S2400, the image may be converted to the halftone scheme appropriate for the image forming device designated in step S2300. In step S2500, the apparent position of black and color halftone pixels may be computed, based on the misregistration input in step S2300. In step S2600, the computed positions of the halftone pixels may be displayed for the document designer. In step S2700, a determination may be made whether the image is acceptable. If not, placement of the black and color elements of the image may be adjusted in step S2800, and the process may return to step S2600, in which the adjusted image may be displayed. If the image is acceptable, the document data may be adjusted in step S2900 to correspond to the adjusted placement of black and color elements of the image. The adjusted document data may then be stored in step S3000. The document may then be printed in step S3100. The process ends in step S3200.

Various alternatives, modifications, variations, improvements, and/or substantial equivalents, whether known or that are or may be presently unforeseen, may become apparent upon reviewing the foregoing disclosure. For example, not all of the steps indicated in FIGS. 10 and 1 may be required to practice the various methods contemplated. For example, the document may not be printed, and therefore steps S900 and S3100 may be omitted. While the embodiments described above relate to a highlight color image forming device, such embodiments should be understood to be illustrative only, as the systems and methods described herein may apply to any number of alternative image forming devices, including, for example, ink jet printers.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A document analysis for indicating misregistration of an image produced by a plurality of color stations, comprising:
   an input device that inputs at least one display parameter;
   a halftone image generator which generates a halftone image representative of a corresponding output of an image forming device and indicates misregistration of the image produced by the plurality of color stations, based on the at least one display parameter; and
   a display for displaying the halftone image generated by the halftone image generator.

2. The document analysis tool of claim 1, wherein the at least one display parameter includes at least one of a scale factor, a vertical misregistration, and a horizontal misregistration.

3. The document analysis tool of claim 2, wherein the halftone image generator generates the halftone image with halftone dots displaced by an amount based on at least one of the vertical and horizontal misregistration.

4. The document analysis tool of claim 2, wherein the halftone image generator generates the halftone image as magnified by the scale factor.

5. The document analysis tool of claim 3, wherein at least one of the vertical and the horizontal misregistration corresponds to a misregistration between locations of exposure patterns placed on a photoconductive surface at a plurality of image forming stations in the image forming device.

6. The document analysis tool of claim 1, wherein the display also displays at least one parameter input object.

7. The document analysis tool of claim 1, further comprising:
   an input device that inputs an adjustment to be applied to at least one element of the halftone image; and
   a microprocessor that adjusts a location of at least one element of the halftone image based on the adjustment input by the input device.

8. The document analysis tool of claim 7, further comprising:
a memory that stores the adjusted location of the at least one element of the halftone image.

9. The document analysis tool of claim 7, wherein the adjustment comprises separating image elements corresponding to different colors by a specified amount.

10. The document analysis tool of claim 1, wherein the image forming device comprises a xerographic image forming device.

11. The document analysis tool of claim 1, wherein the image forming device comprises a highlight color printer.

12. A method of analyzing a document to indicate misregistration of an image produced by a plurality of color stations, comprising:
inputting at least one display parameter;
generating a halftone image representative of a corresponding output of an image forming device and indicating misregistration of the image produced by the plurality of color stations, based on the at least one display parameter; and
displaying the halftone image on a display.

13. The method of claim 12, further comprising:
determining whether the displayed image is acceptable; and
printing the displayed image when the displayed image is acceptable; and
revising the document when the displayed image is unacceptable.

14. The method of claim 13, wherein the at least one display parameter includes at least one of a scale factor, a vertical misregistration, and a horizontal misregistration.

15. The method of claim 14, wherein generating the halftone image further comprises:
displacing halftone dots by an amount based on at least one of the vertical and the horizontal misregistrations.

16. The method of claim 15, further comprising:
adjusting a location of at least one image element when the image is unacceptable.

17. The method of claim 16, further comprising:
adjusting document data based on the adjusted location of the at least one image element.

18. The method of claim 17, further comprising:
storing the adjusted document data.

19. The method of claim 18, further comprising:
printing the adjusted document data.

20. An apparatus for analyzing a document to indicate misregistration of an image produced by a plurality of color stations, comprising:
means for inputting at least one display parameter;
means for generating a halftone image representative of a corresponding output of an image forming device and indicating misregistration of the image produced by the plurality of color stations, based on the at least one display parameter; and
means for displaying the generated image on a display.

* * * * *